United States Patent
Anerousis et al.

(10) Patent No.: US 6,498,797 B1
(45) Date of Patent: Dec. 24, 2002

(54) METHOD AND APPARATUS FOR COMMUNICATION SERVICES ON A NETWORK

(75) Inventors: Nikolaos Anerousis, New York, NY (US); Raman Gopalakrishnan, San Jose, CA (US); Charles Robert Kalmanek, Jr., Short Hills, NJ (US); Alan Edward Kaplan, Morris Township, Morris County, NJ (US); William Todd Marshall, Chatham, NJ (US); Partho Pratim Mishra, Cupertino, CA (US); Peter Z Onufryk, Flanders, NJ (US); Kadangode K. Ramakrishnan, Berkeley Heights, NJ (US); Cormac John Sreenan, Waterfall (IE)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/190,125

(22) Filed: Nov. 12, 1998

Related U.S. Application Data

(60) Provisional application No. 60/066,033, filed on Nov. 14, 1997.

(51) Int. Cl.[7] .................................. H04J 3/12
(52) U.S. Cl. ............... 370/522; 370/252; 370/259; 370/285; 370/401; 379/229; 379/245
(58) Field of Search ................... 370/259, 278, 370/282, 285, 392, 401, 402, 465, 522, 252, 352, 428, 429; 379/88.02, 220.01, 245, 246, 229

(56) References Cited

U.S. PATENT DOCUMENTS

| | | | |
|---|---|---|---|
| 5,243,643 A | * | 9/1993 | Sattar et al. ................... 379/88 |
| 6,134,316 A | * | 10/2000 | Kallioniemi et al. ........ 379/220 |
| 6,157,647 A | * | 12/2000 | Husak ......................... 370/401 |

FOREIGN PATENT DOCUMENTS

| | | | |
|---|---|---|---|
| WO | WO96/09714 | 3/1996 | .......... H04M/11/00 |
| WO | WO97/23988 | 7/1997 | ............ H04M/3/42 |

* cited by examiner

Primary Examiner—Douglas Olms
Assistant Examiner—Shick Hom

(57) ABSTRACT

A method for performing communications over a network comprises receiving a user record for a first user, receiving a query from a second user with regard to the first user, and sending, to the second user, as a response to the query, a call-handling profile.

29 Claims, 3 Drawing Sheets

METHOD AND APPARATUS FOR COMMUNICATION SERVICES ON A NETWORK

This invention claims priority to provisional application serial No. 60/066,033, filed on Nov. 14, 1997. That application is hereby incorporated by reference.

FIELD OF THE INVENTION

The present invention relates to communication services over a network. More particularly, the present invention relates to supplying various telephone-related services on a network

BACKGROUND OF THE INVENTION

A significant amount of all personal communication is conducted over a communication network. Such personal communications include voice communication, data communication, etc. Each communication process can be divided into a plurality of stages that are necessary whether the communication is conducted over a wireline or wireless network. The first stage is a procedural stage in which the parties may verify their authority to communicate with each other, and determine whether possible compatible formats exist for their communication.

The second stage is the connection-establishing stage in which a path is established along which signals can flow between users. This path is necessary because to make a telephone call, send and/or receive a facsimile or the like, communications devices serving the calling party and called party must be connected together in some compatible way. The first two stages are closely related in that, to complete the task, it is necessary to have compatible terminals at both ends of the path, and the terminals must be compatible with the network equipment. In the final stage, the users actually communicate, using their knowledge of the mode of communication and the other user's capabilities.

The telephony services currently available, however, are constrained by the technology used. For example, for users to telephone one another around the world, a numbering plan is maintained in which customer stations are identified by, for example, subscriber codes, exchange codes, area codes, and country codes. This type of communication typically occurs over a wireline circuit-switched network like the Public Switched Telephone Network ("PSTN"), or over some wireless network.

The PSTN uses directory services to support features such as toll-free number services, which allow a single dialed number to be mapped to many different telephone numbers based on certain rules or preferences This "single number reach" is achieved by a network switch attempting to set up the call based on the translation of the "name" (e.g., 800 number) to a unique telephone number, but does not allow sufficient flexibility that comes from allowing users to reroute their communications in an easy fashion. For example, to reach the vast majority of PSTN subscribers, a caller needs to know the network logical address (telephone number) of the terminal closest to the subscriber's current location, e.g. his office phone, home phone, car phone, etc.

Network directory services can provide a convenient way to insulate users from the need to deal with network addresses. The Domain Name System (DNS) is a familiar example of a directory service that translates host names to Internet addresses.

Another method of service, employed in circuit-switched networks, is the use of a Network Control Point ("NCP"). The NCP is a physical point accessible by a network where various management and control functions are implemented. An example of a use of the NCP occurs with regard to toll-free calls. The NCP resolves the toll-free number with the business subscriber's network address. That is, when one calls a toll-free number, a signal is first sent to the NCP where the dialed number is matched and translated to the called party's logical network address.

In a packet-switched network, a conventional directory service like X.500 is used to permit applications (such as electronic mail) to access either central or distributed information. The X.500 standard for directory services provides the means to consolidate e-mail directory information through central servers situated at strategic points throughout the network. These X.500 servers then exchange directory information so each server can keep all its local mail directory information current. With X.500, any e-mail user can be listed in a central directory that can be accessed using an X.500-compatible user agent.

SUMMARY OF THE INVENTION

To alleviate the problems in the prior art, a network directory service is introduced to provide a simple dial-by-name capability that can be used on a network. Specifically, the present invention relates to a system and method for performing telephony over a network.

To use these provided services, a caller can place a call using a distinguishing name that uniquely identifies the person they wish to reach. The directory maps a query for a distinguishing name to one or more call appearances, each of which typically represents a terminal at which the user can be reached. Call appearances can also refer to other ways of contacting a user, such as a voice mail server or a secretary. In this way, the directory can support both user mobility (users can be reached at any terminal by updating their directory entry with the address of their present location) and terminal mobility (a user can continue to receive calls to a mobile terminal even if its network address changes). In the PSTN, the "single number reach" capability is achieved by a network switch attempting to set up a call based on the translation of the name to a unique telephone number.

As a context for the present invention, but not the only context, consider a packet-switched network like the Internet offering a variety of services to subscribers. In one embodiment of the present invention, a subscriber in this case can, when subscribing to the service, supply the network directory server with a variety of information, and create a record of information that allows the network directory server to expedite a telephone call between the subscriber and one desiring to place a call to the subscriber. As part of this record, the subscriber is then assigned at least one distinguishing name, which is a unique string that points to or refers to the user record, so that he can be reached by that distinguishing name regardless of his location on the network. Subsequently, when the subscriber moves from one location to another, he can register his existence in the new location with the directory server. Now, when a caller in this example seeks to call the subscriber, all the caller needs to do is place a call to the subscriber using the subscriber's distinguishing name. When the unique distinguishing name is dialed, the network directory server receives the distinguishing name and returns information on how the called party can be reached.

In one embodiment of the present invention, a user record is received for a first user. A query is then received from a caller or second user whose intention it is to contact, via the network, the first user. In response to the second user's query, a call-handling profile that corresponds to the first user is sent to the second user, and a media exchange is established based on the call-handling profile. Note that for purposes of the present invention, the phrase "first user" includes, but is not limited to, service subscriber, terminating party, called party, or callee. Additionally, for purposes of the present invention, the phrase "second user" includes, but is not limited to, a caller or an entity wishing to contact the first user.

DETAILED DESCRIPTION

Embodiments of the present invention are directed to ways of supplying communication services in a network.

Assume, as a context, that terminals have built in processing capabilities, or can connect to a server that contains processing capabilities. Embodiments of the present invention allow end-systems to use information provided by the directory service directly, thus exploiting the enhanced capabilities of the terminals in use at the end system. The directory service also allows for the incorporation of query-handling profiles that allow a terminating party to control which call appearances are returned by name resolution queries.

To put the invention in another context, but not the only context, the directory may be viewed as a distributed database and operations on that database. A hierarchical name space is used to derive the distinguishing names of users. Thus, embodiments of the present invention allow multiple hierarchical name spaces to be defined over the database. In this way, a user record can be accessed through an X.500 distinguishing name (e.g., Common Name=Graham Bell, Organization=ATT, Country=US) [X500], an email address (e.g., graham_bell@att.com) or a regular telephone number. In addition, the directory may support traditional database search functions, so that users do not need to remember distinguishing names. For example, it may be possible to look up users by name, address, etc.

Figure 1:
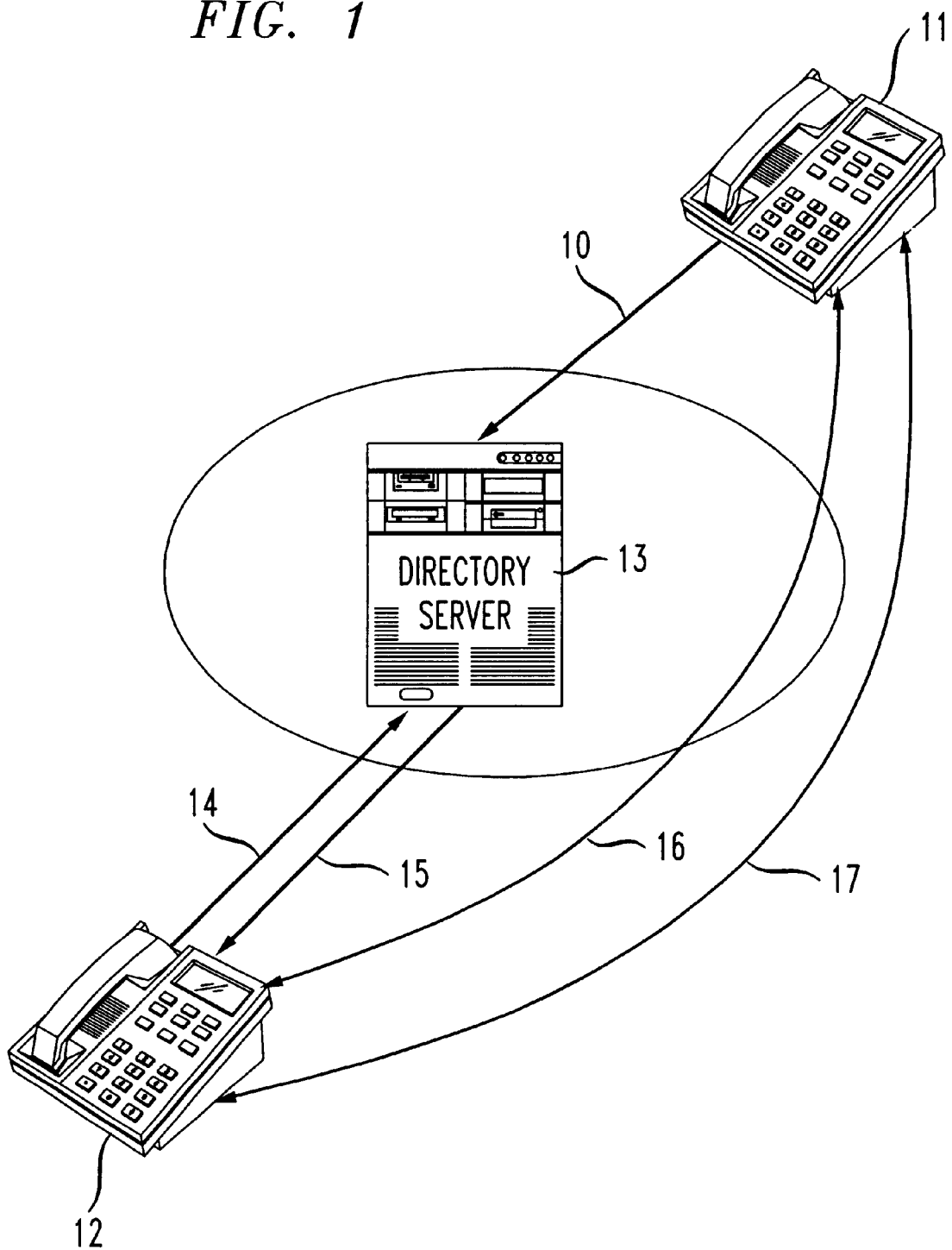
FIG. 1 is a system overview of an embodiment of the present invention showing a first and second user, a network, and a directory server.

Referring now in detail to the drawings, FIG. 1 illustrates a system overview of an embodiment of the present invention. In this embodiment, a first user 11 registers certain information with directory server 13. Subsequently, second user 12 places a call to first user 11 by first sending a query 14 to directory server 13 and receiving response 15 to query 14. Response 15 gives second user 12 the information needed to signal first user 11 via a signaling exchange 16 and ultimately establish a media exchange 17 between the two parties. Two examples of media exchanges, although not the only examples, can take the form of a telephone conversation, or a fax machine to a fax machine transmission.

Figure 2:
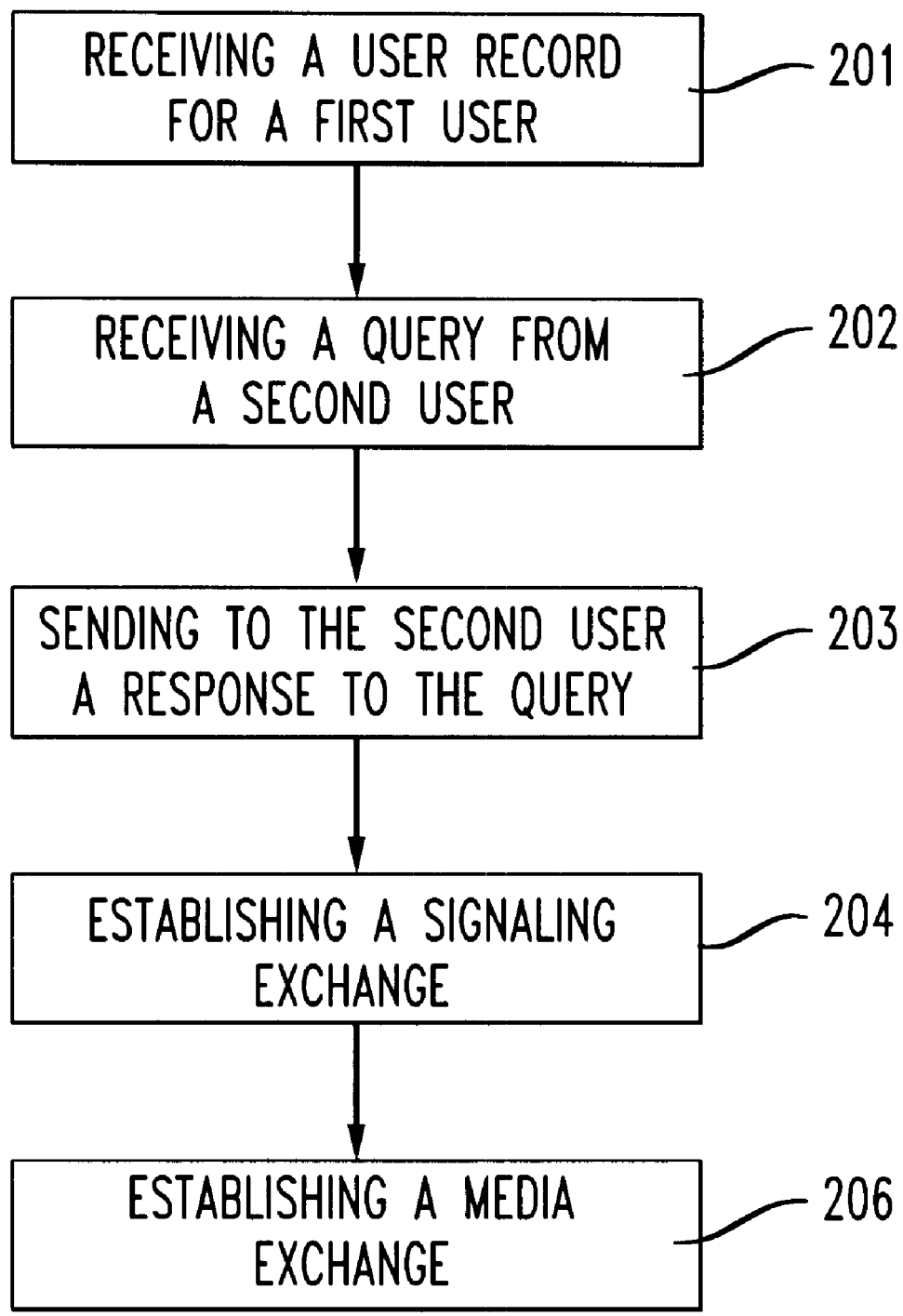
FIG. 2 is a flow chart of a method according to an embodiment of the present invention.

FIG. 2 is an embodiment of a method in accordance with the present invention. At step 201, a user record is received at directory server 13 from first user 11. For the purposes of the present invention, the word "received" includes, but is not limited to, "created" and "configured." The user record can be received from the first user, or can be received from the network. Each user record is associated with one or more distinguishing names. The user record can contain information about the user (e.g., full name, address, etc.), a number of queer-handling profiles, one or more call appearance sets where the user can be reached, and credentials to authenticate the user. The credentials can be used by the directory to authorize a change in the user record. The credentials can also be used by external servers to authenticate access to network services.

At step 202, a query is received from a second user. The second user may desire, for example, to speak with the first user. The second user may alternatively want to leave voice mail for a first user, or send a fax to a first user. At step 203, a response to the second user's query is sent to the second user. This response is called a call-handling profile, and includes information for contacting, either directly or indirectly, the first user. The records in the call-handling profile are selected from the call-appearance set. The directory server may, however, add fields, delete fields, or change the content of fields found in the original call-appearance set. The fields in the call-handling profile include information with regard to how to contact the first user in the desired manner.

At step 204, a signaling exchange is established. In other words, a negotiation occurs to establish a media exchange between the first party's and second party's terminals. Finally, assuming the negotiation is successful, in step 206 a media exchange is established between the first and second user. The media exchange can include, for example, a telephone conversation, a fax-to-fax transmission, a person-to-voice-mail transmission, etc.

Figure 3:
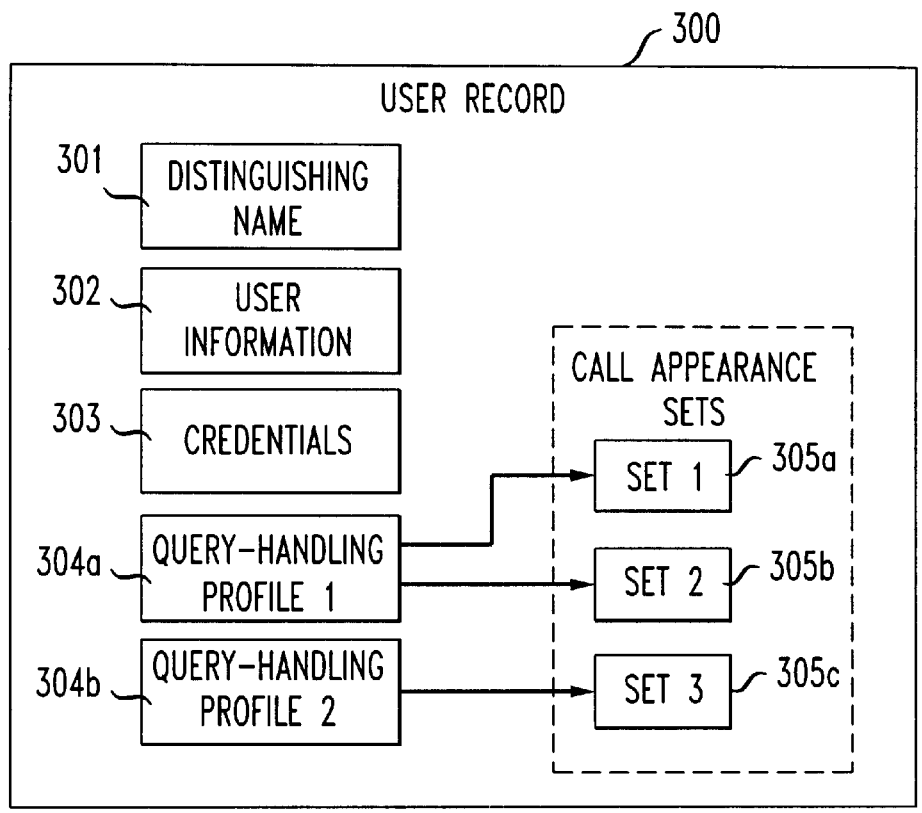
FIG. 3 is a block diagram of a user record inaccordance to an embodiment of the present invention in which the user record contains a distinguishing name, user information, credentials, query-handling profiles, and call-appearance sets.

An example of a user record is illustrated in FIG. 3. In this figure, the user record contains distinguishing name 301, user information 302, credentials 303, and two query-handling profiles, 304a and 304b, respectively. Distinguishing name 301 is a name that uniquely identifies a user.

Query-handling profile 304a contained in user record 300 is used to determine the response provided to incoming queries about this user. Query-handling profile 304a allows users at least to control access by specifying who can reach them, where they can be reached, and when they can be reached. Query-handling profile 304a contains a table of matching rules that are executed sequentially. Every rule is associated with a call-appearance set. A call-appearance set is a group of call appearances that are returned to the querying terminal representing the different ways in which the user can be reached. There is always a default call appearance set that is returned if the query-handling profile cannot match the incoming query to a particular rule.

TABLE 1

Example of a call appearance set

| Type | Identifier | NLA | TLA | Terminal Capabilities | Application Information | Priority | Timeout | Comment |
|---|---|---|---|---|---|---|---|---|
| Terminal | ESN1 | NLA1 | TLA1 | audio G.711 | none | 1 | 30 sec | work phone |
| Terminal | ESN2 | NLA2 | TLA2 | audio G.711 video H.261 | none | 2 | 20 sec | home phone |
| TTS | TTS_ID | NLA3 | TLA3 | audio | ESN3 | 2 | 30 sec | mobile phone |
| DN | my_secy @ stt.com | | | | | 3 | | secretary |
| PSTN | | | | audio G.711 | (973)-555-1212 | 4 | 15 sec | parent's POTS phone |
| Server | VM_ID | NLA4 | TLA4 | audio | VM box # | 5 | 10 sec | voice mail |

Table 1 displays an example of a call-appearance set. A call-appearance set consists of a number of call appearances. Each call appearance is typically associated with a terminal device or server and contains a set of fields.

The type field identifies the type of the call appearance. In most cases, the type refers to a terminal or to a server, such as a voice mail server. Other examples of "types" include a terminal tracking server, a PSTN number, the distinguishing-name type, etc. In addition, a call appearance may be a pointer to another user record or distinguishing name within a user record, or indicate that the call appearance exists within another network domain, in which case a gateway must be employed.

The identifier field contains optional information that can be used to identiify the call appearance among others of the same type. For example, call appearances for terminal devices may contain an electronic serial number. The electronic serial number can be used to support terminal mobility, that is, to update the relevant call appearances when a terminal changes its network address. The user record can also contain the distinguishing name of other users, for example the distinguishing name of a delegate of the first user. For example, if the first user would like a certain telephone call to be routed to the first user's secretary, the first user can place in the user record the secretary's distinguishing name.

The NLA/TLA fields contain the network layer address of a terminal device or server or the like, and the transport layer address (if any) of an application specified by the first user. The format of the addresses stored in these fields may differ depending on the network to which this terminal is attached. For telephony gateways, the NLA/TLA of the gateway may be statically assigned, or may be dynamically generated by the local directory server using a specialized gateway location mechanism because the address of the gateway to be used may depend on the location of the second user. The NLA/TLA fields are typically omitted when the call appearance contains another distinguishing name.

The terminal-capabilities field contains information about the media processing capabilities of the terminal (e.g., video, voice or fax), or the preferences of the user for a particular media type for communication.

The application information field is used to convey additional information to the calling application. For example, for a call from a packet telephone to a call appearance on the PSTN, the phone number associated with the distinguishing name may be stored in the directory server, and passed to the gateway by the calling application.

The priority field indicates the order in which call appearances should be attempted from the second user's terminal. Entries with the same priority are attempted at the same time (the equivalent of having several phones ring at once).

The timeout field indicates the amount of time before trying the next call appearance if no reply is received. If multiple entries have the same priority, one can use the maximum timeout before attempting calls to lower priority.

Finally, a comment is used in this example as a reminder, for both the first user and the second user, of the nature and function of the call appearance. In general, the comment can contain any information.

Table 1 above illustrates a call appearance set for a user who has indicated as his first preference the terminal at his office. In this example, assuming that the full call-appearance set is returned as the call-handling profile, the caller tries his terminal first; if no reply is received within 30 seconds, the caller tries simultaneously the next two call appearances: the terminal at the user's home and a cellular phone (accessed indirectly through a terminal tracking server). If these call appearances fail to provide a response, the terminal attempts to contact the person's secretary by initiating a second directory query. If this fails as well, the terminal attempts to reach a PSTN phone through a gateway. Finally, if everything else has failed, the caller attempts to connect to the callee's voice-mail server.

User records are created when a user subscribes for service. At that time, the user supplies, as an example, the user's name, billing address, and service preferences to a service representative, who then assigns one or more distinguishing names. To maintain compatibility with domains that use only numeric addressing such as the PSTN, a unique telephone number can also be assigned as an alternative distinguishing name. Cryptographic credentials for user authentication and registration are also created at the time of service subscription.

A directory entry is required only for users who wish to receive calls or to be contacted in some way. An "anonymous" user who does not have a directory entry with stored credentials can also contact others as long as the anonymous user has provided some means of being charged for the service (e.g., a prepaid calling card, etc.), or if the connection is being paid for by the receiving party (e.g., 800 number).

For a user to receive calls or to be contacted in some way, one or more call appearances must be entered into the directory record. Call appearances can be configured in the following three different ways: statically, when the service representative creates the record; off-line, when the service subscriber uses directory management software to configure his/her record from, say, a computer; and dynamically, when the user registers at a new terminal to receive calls or to be contacted, or moves one of his previously registered terminal devices to a new location. The user can register at a terminal that may retain his information (e.g., his home phone) or to a terminal not associated with a user (e.g., a public phone).

In the last two cases, the directory must authenticate the user, by using the credential information stored in the user's record, to prevent unauthorized access to the database. Once authenticated, the user can update or delete existing call appearances, add new ones, or update his query-handling profile to implement a new query resolution policy.

When a directory entry is configured off-line or dynamically, a challenge-response protocol may be used to authenticate the user. The terminal device may not have a keyboard, in which case the user may employ a smart card where the necessary credentials are stored. When the smart card is used at a public terminal, the directory can be updated automatically with a new call appearance entry for this terminal. Similarly, when the user's terminal moves to a new location, it may have been authorized beforehand to update the call appearance record in the directory with its new NLA/TLA for that user (possibly with a password). The user has some flexibility to define the desired level of security for updating the directory record. In addition, the introduction of a new call appearance in the user's record or the modification of an existing one to reflect the new address of a terminal can be specified to be valid only for a defined period of time. For example, user registration at a public phone need only be valid when the smart card is in place. Explicit user deregistration can also trigger updates of the relevant call appearance records. Deregistration from a public terminal can trigger a deletion of the corresponding call appearance.

To contact another user, the second user queries the directory to obtain the call appearance or appearances of the person the second user wishes to contact. The only information that is required in a query is a distinguishing name of the first user, i.e., the contacted party. Optionally, second users may also supply their own distinguishing names, the types of media to be included in the call or connection, the capabilities of the second user's terminal and an indication of urgency.

The directory also supports the concept of a user persona. In this case, the second user supplies additional information that identifies the role in which a user is being contacted, for example professional, social, soccer coach, etc. Every user persona can be handled by a different query-handling profile. The query-handling profile contains information for handling a query related to the distinguishing name/persona being contacted. The query-handling profile can produce different responses indicating where a user can be reached based on various fields that include, but are not limited to, who sent the query, the time-of-day, the date, the persona contacted, urgency, and the media capabilities of the second user's terminal or terminals. In addition to providing customizability, this allows the user greater control over the privacy of information compared to a traditional directory service.

The directory server can do some amount of processing to ensure that the second user's and first user's terminals are compatible. This optimization can minimize the amount of end-to-end capabilities negotiation during connection establishment for a subset of well-defined forms of communication, such as simple telephony.

The response to a query is a call-handling profile. Referring to FIG. 2, a call-handling profile is sent to the second user in step 203 in response to the query, and includes information to be used by the second user to communicate with the first user in the desired manner. The call-handling profile is created as a result of executing a query-handling profile found in the first user's user record. For example, the query-handling profile can contain instructions both to select and change a call appearance from a call-appearance set.

The call-handling profile can be derived from a call-appearance set in the user record by adding or filtering out or changing some fields, and the specific contents of the call handling profile are determined by executing the rules specified in the first user's query handling profile. These rules generate the call appearances in the call handling profile by adding or removing some fields in the call-appearance set, or changing the value of a field existing in the call-appearance set. Additionally, the call-handling profile can be derived from system information such as the date or time of a certain communication. Specifically, a call-handling profile can comprise all or some fields of a call-appearance set and can include additional fields and information not found in the original call-appearance set. For example, the directory server can calculate the cost of the connection and then return this cost as a field in the call-handling profile. The call-handling profile returned to the second user allows the second user to choose which call appearance to use when contacting the first user. This feature thus gives some degree of control to the second user as to how to contact the first user. For example, a second user may choose to not use call appearances that the second user deems too expensive. As another example, a user may wish to speak to a secretary rather than use voice mail, or may prefer to leave voice mail rather than speak with a secretary.

One can see in the above example that the call-handling profile allows the second user to exercise choice over where and how to reach the first user. For example, if a first user has a multiplicity of terminals where the first user would like to be reached, the first user returns this information to the caller. The call-handling profile allows the second user at least to choose where and how to reach the first user depending both on the first user's and second user's preferences.

If terminal capabilities are included in the call-handling profile, these terminal capabilities may not be the full set of capabilities that the particular call appearance can support. This allows a first party to limit the terminal capabilities depending on who the second party is, the time of day, etc. For example, a first user may wish to restrict incoming calls from certain people to be audio only.

The call-handling profile can be conveyed and acted on by the second user in a variety of ways depending, at least, on how sophisticated the caller's user interface is. If the caller's terminal has, for example, a standard computer screen, the call-handling profile can be displayed as text and the caller can make a choice. As another example, if the caller has only an audio interface, the call-handling profile can be played out using a text-to-speech converter.

Fields can be added to a call appearance to implement various services. For example, the directory could insert an estimate of the per-minute cost for communicating with a particular call appearance. The second user could then use this information to restrict "expensive" call appearances or keep track of the accumulated cost of a call.

Additionally, fields within a call-appearance set can be changed as necessary for creating a call-handling profile. For example, when connected to a PSTN telephone through a gateway, the NLA/TLA field can be dynamically changed by the directory server to point to the gateway that can route the call in an efficient way.

When the calling application receives this information, it may use the call-handling profile directly, taking into consideration application or user policy, or it might display the call-handling profile to the second user (if the terminal is equipped with a display) awaiting further instructions. For example, the second party may want to skip call appearances that do not meet the second party's current needs (e.g., a voice mailbox) or are too expensive.

A directory record can be updated when a user moves between terminals or a terminal changes its point of attachment to the network and receives a new network-layer address (NLA). This works well as long as a user is registered at a terminal that does not move frequently; i.e., on the time scale of seconds or minutes. Several performance problems, however, manifest themselves with fast-moving terminals. First, directory servers are usually optimized to support a high rate of lookups, but support a relatively low update rate. Second, it may be inefficient to update the home server every time a terminal changes its NLA, because the directory server may be far from the current terminal location.

To deal with the inefficiency of having to update the home directory service each time the terminal changes its NLA, a terminal-tracking server is used. A mobile terminal acquires an NLA and the address of the nearest terminal-tracking server from the network via auto-configuration. The mobile terminal then registers its electronic serial number and current NLA with the terminal-tracking server. When a user registers at a terminal, the user record in the home directory is updated with a call appearance containing the network layer address of the terminal-tracking server, rather than the address of the terminal, in addition to information that identifies the terminal as a mobile terminal. In response to a query, the home directory server contacts the terminal-tracking server to obtain the current NLA of the terminal and returns this value to the second party.

As long as a terminal moves within the domain of a particular terminal-tracking server, there is no need to update any entry at the directory server. When a terminal moves to the domain of a new terminal-tracking server, however, the following steps are necessary:

1. update the entry at the previous terminal-tracking server to point to the new terminal-tracking server; and
2. update the directory server entry (for each user registered at the terminal) to point to the new terminal-tracking server.

Figure 4:
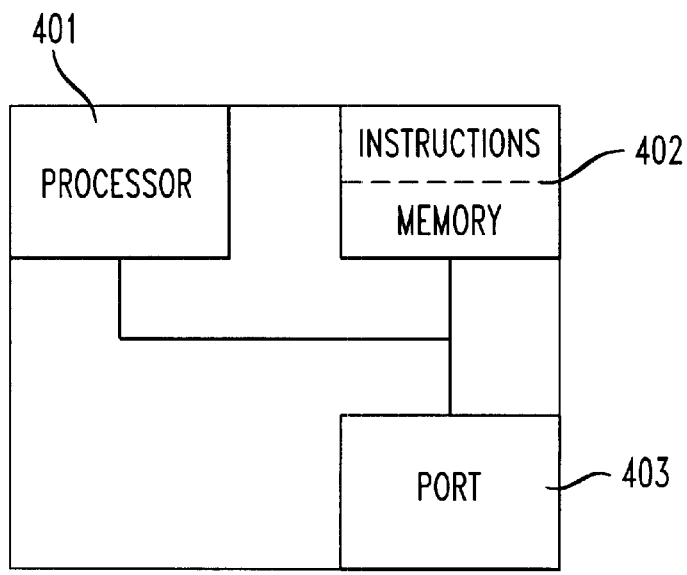
FIG. 4 is a block diagram of an apparatus according to an embodiment of the present invention.

FIG. 4 is a block diagram of an apparatus in accordance with an embodiment of the present invention. The apparatus contains a processor 401 coupled to memory 402 and port 403. Memory 402 stores instructions adapted to be executed by a processor to carry out the method in accordance with an embodiment of the present invention. For example, in one embodiment of the present invention, memory 402 stores instructions adapted to be executed by a processor to receive a user record for a first user, receive a query from a second user with regard to the first user, and send, to the second user, as a response to the query, a call-handling profile.

As discussed with regard to the method above, the user record must include a distinguishing name for the first user, and in addition, can include any of the following, in any combination: a call appearance's network-layer address; a call appearance's transport-layer address; a query-handling profile; a distinguishing name for the delegate of the first user.

The user record can be configured dynamically. For the purposes of the present invention, the word "dynamically" as used in this context includes, but is not limited to, automatically updating the user record after a terminal has been moved from one network connection to another, automatically updating the user record by use with a smart card, or any type of automatic network update at the time the update is needed.

In one embodiment of the present invention, a first terminal tracking server updates the user record with the first terminal tracking server's NLA and/or TLA. In another embodiment of the present invention, the user record can be dynamically updated to identify a second terminal-tracking server when a terminal moves to a new domain containing the second terminal-tracking server.

In one embodiment of the present invention, the received query can include, but is not limited to, any of the following: the capabilities of the second user's terminal; an indication of urgency; a first-user persona; a first user's distinguishing name; a second user's distinguishing name; preferences of the second user regarding media exchange;

conditions under which the second user is willing to communicate (e.g., financial conditions, whether the second user desires to split the billing, whether there is a maximum cost per hour or a maximum overall cost the second user is willing to accept, whether the second user will communicate only if the first user pays for the interaction, etc.).

For the purposes of this application, memory includes any medium capable of storing instructions adapted to be executed by a processor. Some examples of such media include, but are not limited to, floppy disks, CDROM, magnetic tape, hard drives, and any other device that can store digital information. In one embodiment, the instructions are stored on the medium in a compressed and/or encrypted format. As used herein, the phrase "adapted to be executed by a processor" is meant to encompass instructions stored in a compressed and/or encrypted format, as well as instructions that have to be compiled or installed by an installer before being executed by the processor.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

What is claimed is:

1. A method for performing communications over a network comprising:

(a) receiving a user record for a first user, wherein the user record contains a distinguishing name for the first user and a call-appearance set comprising at least one call appearance and wherein the call appearance set includes a reference to a first terminal-tracking server and wherein the user record is configured to point to a second terminal-tracking server when a terminal moves to a domain served by the second terminal-tracking server;

(b) receiving a query from a second user with regard to the first user;

(c) generating, as a response to the query, a call-handling profile to be used by the second user to communicate with the first user, wherein the generated response is derived at least from information stored in the first user record; and (d) sending, to the second user, the call-handling profile.

2. The method of claim 1, wherein the received query comprises a second user's distinguishing name.

3. The method of claim 1, wherein the received query comprises the capabilities of the second-user's terminal.

4. The method of claim 1, wherein the received query comprises a first-user persona.

5. The method of claim 1, wherein the received query comprises a second user's preferences regarding the media exchange.

6. The method of claim 1, wherein the received query comprises information as to conditions under which the second user is willing to communicate.

7. The method of claim 1, wherein the received query comprises an indication of urgency.

8. The method of claim 1, wherein the received query comprises a second user's persona.

9. An apparatus for performing communication over a network comprising:

(a) a processor;

(b) a port coupled to said processor;

(c) a memory coupled to said port and said processor, storing instructions adapted to be executed by said processor to:

(i) receive a user record for a first user, wherein the user record contains a distinguishing name for the first user and a call-appearance set comprising at least one call appearance and wherein the call-appearance set includes a reference to a first terminal-tracking server and wherein the user record is configured to point to a second terminal-tracking server when a terminal moves to a domain served by the second terminal-tracking server;

(ii) receive a query from a second user with regard to the first user;

(iii) generate, as a response to the query, a call-handling profile to be used by the second user to communicate with the first user, wherein the generated response is derived at least from information stored in the first user record; and (iv) send, to the second user, the call-handling profile.

10. The apparatus of claim 9, wherein the received query comprises a second user's distinguishing name.

11. The apparatus of claim 9, wherein the received query comprises the capabilities of a second-user's terminal.

12. The apparatus of claim 9, wherein the received query comprises a first-user persona.

13. The apparatus of claim 9, wherein the received query comprises a second user's preferences regarding a media exchange.

14. The apparatus of claim 9, wherein the received query comprises information as to conditions under which the second user is willing to communicate.

15. The apparatus of claim 9, wherein the received query comprises an indication of urgency.

16. A computer-readable medium that stores instructions adapted to be executed by a processor to:

(a) receive a user record for a first user, wherein the user record contains a distinguishing name for the first user and a call-appearance set comprising at least one call appearance and wherein the call-appearance set includes a reference to a first terminal-tracking server and wherein the user record is configured to point to a second terminal-tracking server when a terminal moves to a domain served by the second terminal-tracking server;

(b) receive a query from a second user with regard to the first user;

(c) generate, as a response to the query, a call-handling profile to be used by the second user to communicate with the first user wherein the generated response is derived at least from information stored in the first user record; and (d) send, to the second user, the call-handling profile.

17. The computer-readable medium of claim 16, wherein the received query comprises a second user's distinguishing name.

18. The computer-readable medium of claim 16, wherein the received query comprises the capabilities of the second-user's terminal.

19. The computer-readable medium of claim 16, wherein the received query comprises a first-user persons.

20. The computer-readable medium of claim 16, wherein the received query comprises a second user's preferences regarding the media exchange.

21. The computer-readable medium of claim 16, wherein the received query comprises information as to conditions under which the second user is willing to communicate.

22. The computer-readable medium of claim 16, wherein the received query comprises an indication of urgency.

23. An apparatus for performing communication over a network comprising:

(a) a processor;

(b) a port coupled to said processor;

(c) a memory coupled to said port and said processor, storing instructions adapted to be executed by said processor to:

(i) receive a user record for a first user, wherein the user record contains a distinguishing name for the first user;

(ii) receive a query from a second user with regard to the first user;

(iii) generate, as a response to the query, a call-handling profile to be used by the second user to communicate with the first user, wherein the generated response is derived at least from information stored in the first user record;

(iv) send, to the second user, the call-handling profile;

(v) establish a signaling exchange based on the call-handling profile; and (vi) establish a media exchange following the signaling exchange.

24. A computer-readable medium that stores instructions adapted to be executed by a processor to:

(a) receive a user record for a first user, wherein the user record contains a distinguishing name for the first user;

(b) receive a query from a second user with regard to the first user;

(c) generate, as a response to the query, a call-handling profile to be used by the second user to communicate with the first user wherein the generated response is derived at least from information stored in the first user record;

(d) send, to the second user, the call-handling profile;

(e) establish a signaling exchange based on the call-handling profile; and (f) establish a media exchange following the signaling exchange.

25. A method for providing telephony services over a network, comprising:
- (a) receiving information about a first user over the network, the information including a distinguishing name, at least one query handling profile and at least one call appearance;
- (b) receiving a query from a second user over the network, the query including the distinguishing name;
- (c) creating a call handling profile based on the distinguishing name, the query handling profile, and the call appearance, wherein the query handling profile is associated with at least one call appearance set, each call appearance set including at least one call appearance, and wherein the query handling profile includes a table of matching rules, each rule being associated with the call appearance set; and
- (d) sending a response to the second user over the network, the response including the call handling profile.

26. The method of claim 25, wherein the call appearance includes a type, a network layer address, a terminal capability, a priority, and a timeout.

27. The method of claim 26, wherein the call appearance includes at least one of an identifier, a transport layer address, and application information.

28. The method of claim 26, wherein the call appearance includes a network layer address of a first terminal-tracking server currently associated with the first user, and wherein the method further comprises updating the call appearance to replace the network layer address of the first terminal-tracking server with a network layer address of a second terminal-tracking server currently associated with the first user.

29. The method of claim 26, wherein the call handling profile includes a superset of the information about the first user and wherein the superset includes a connection cost.

* * * * *